Patented Feb. 13, 1923.

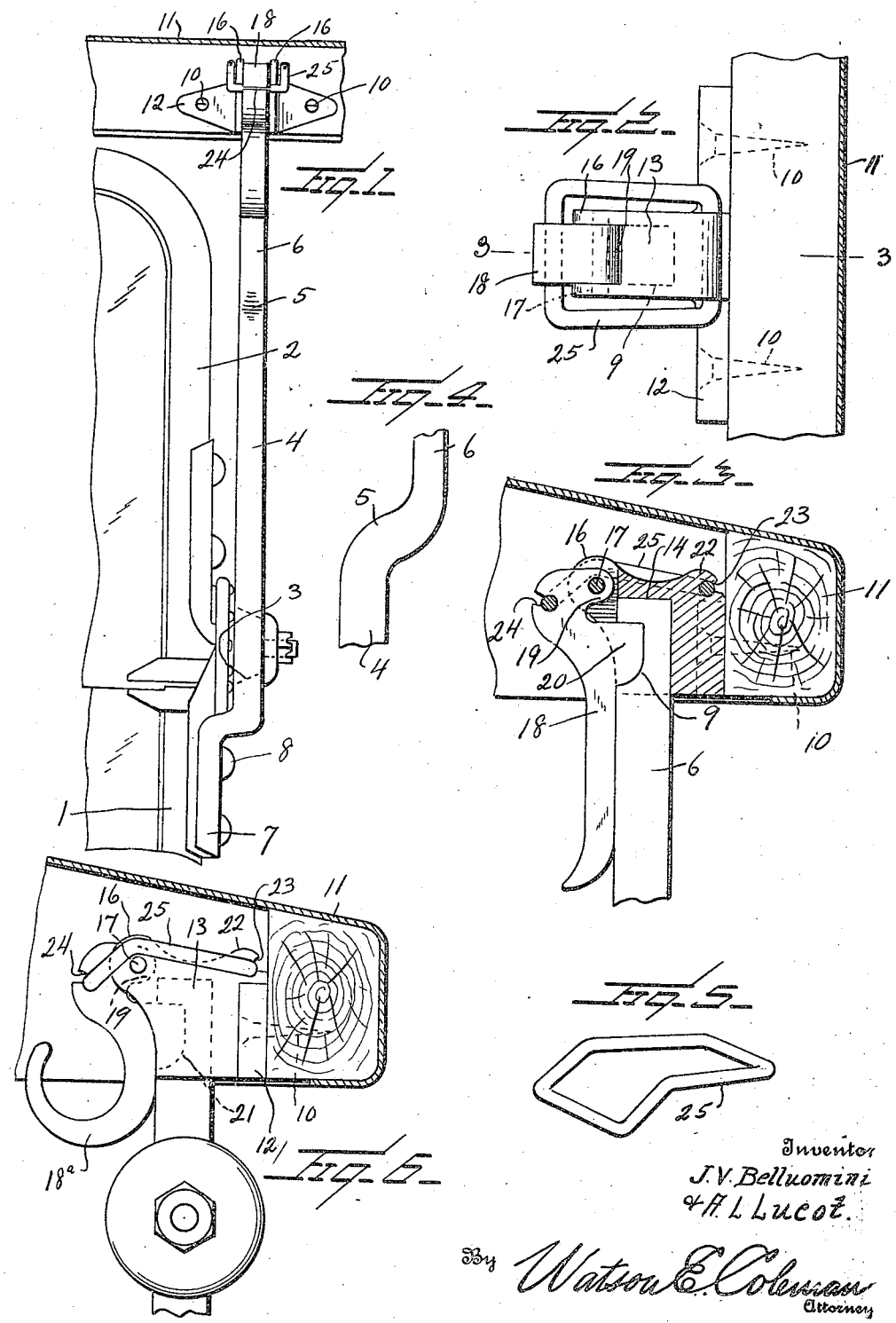

1,445,064

UNITED STATES PATENT OFFICE.

JOHN V. BELLUOMINI AND AMILE L. LUCOT, OF JACKSON, CALIFORNIA.

AUTOMOBILE TOP AND WINDSHIELD COUPLING.

Application filed January 31, 1922. Serial No. 533,089.

*To all whom it may concern:*

Be it known that we, JOHN V. BELLUOMINI and AMILE L. LUCOT, citizens of the United States, residing at Jackson, in the county of Amador and State of California, have invented certain new and useful Improvements in Automobile Top and Windshield Couplings, of which the following is a specification, reference being had to the accompanying drawings.

The present invention has for its purpose the provision of a device of this general character, especially adapted for use in connection with Ford automobiles, though it may be applied to other makes of motor driven vehicles equally as well.

Heretofore on Ford automobiles, the forward part of the top has been connected to the windshield by means of a strap and hook, which allows the top to shift and twist in different directions, causing the top to sag, and under such conditions the top does not turn the rain as it should, therefore wearing the water-proof material of the top, and therefore causing expense for a new top.

The present invention aims to overcome these disadvantages, by providing an improved coupling between the forward part of the top and the upper portion of the frame of the windshield, so as to prevent sagging of the top, holding the same firm, in order to cause it to shed or turn the water.

Furthermore automobile couplings of this character may be very easily and quickly operated, allowing the top to be disconnected from the windshield frame and vice versa with ease and convenience, and in considerable less time than with previous couplings.

A further purpose is the provision of an extension post carried by the windshield pivot or joint, in order that the forward part of the top may be secured thereto, instead of to the windshield. The extension post is only used where the device is particularly applicable to the aforenamed automobiles. But, however, when the coupling is applied to other makes of automobiles, the extension post is dispensed with, and in lieu thereof the coupling is applied direct to the upper portion of the windshield, and to the top, thereby not only facilitating the work of attaching the top to the windshield and vice versa, but also making a better connection, one wherein the windshield post will not rattle, but all parts will remain firm. Furthermore the vibration of the automobile cannot work the coupling loose, and also when the windshield frame and top are positioned for connection, the latch or lock will instantly lock the parts together.

A still further purpose is the provision of a plate secured upon the forward part of the top including a socket for the extension post, or the upper end of the side of the windshield frame, together with a spring tensioned lever, wherein the spring is capable of holding the latch or lock open, or holding it closed, due to the spring being connected to the stationary and movable parts, in such wise that the connections are made above and below the pivot of the latch or lock, to hold the top in position.

Additionally the extension post of the windshield or the perpendicular side of the windshield is provided with a lug to enter a socket of a plate on the top, in order to hold the various parts connected securely and firmly in position.

Also the spring device eliminates the use of thumb screws or bolts, which are always working loose, therefore wrenches or other tools are unnecessary to adjust the windshield, or to adjust the parts of the coupling.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of the improved coupling, as applied to the perpendicular side edge of the windshield, and connected to the top of the automobile;

Figure 2 is a plan view of the same;

Figure 3 is a vertical sectional view on line 3—3 of Figure 2;

Figure 4 is a detail view of a portion of one of the extension posts showing the bend 5;

Figure 5 is a detail perspective view of the spring loop;

Figure 6 is a sectional view through a portion of an automobile top, wherein the extension post is eliminated, and a coupling applied to the side rod of the windshield and forward portion of the top.

Referring to the drawings, 1 designates the lower section of the frame of the windshield, and 2 the upper section of the frame, and mounted upon the bosses of the joints 3 of said upper and lower sections of the windshield is an extension post or rod 4. The upper portion of the post is provided with an offset bend 5, which terminates in an extension 6. The lower portion of the extension post is provided with a depending portion 7, which is bolted or otherwise secured at 8 to the lower section of the frame of the windshield.

The extremity of the portion 6 of the extension post or rod has a notch 9, and secured by any suitable means preferably screws 10 to the frame 11 of the top of the automobile is a plate 12, which has a boss 13 of the shape or contour shown in the drawings. This boss 13 has a socket 14 for the reception of the extremity of the portion 6. The rear portion of the boss 13 has projecting ears or lugs 16, in bearings of which a pivot pin 17 is mounted. Mounted between the ears or lugs 16 and upon the pin 17 is a latch or lock lever 18. This lever or latch is preferably of the shape shown, the circular extension 19 thereof engaging between the ears or lugs 16, in order to receive the pivot pin 17.

The forward face of the latch or lock lever is provided with a lug 20, which enters the recess 9 of the upper end of the extension post or rod 4.

In cases where the coupling is applied to windshields having the pivot joint between its two sections very close to the top, the extension post or rod is dispensed with, and in this instance the upper extremity of the perpendicular side of such windshield has a socket 21, to receive the locking lug 20, in order to connect the top to the windshield.

The upper face of the plate 12 is provided with a lug 22 having a notch 23. The rear edge portions of the curved end of the latch or lock lever is provided with a notch 24, and 25 designates a spring loop, which, in side elevation has one portion extending in an obtuse angle to the other portion. In plan view, however, the spring loop is rectangular, but in side view the spring loop is bent, in order to extend over the pivot pin 17. When the spring loop is fitted in place, it engages the notches 23 and 24, the former being carried by the plate 12, and the latter being carried by the latch or lock lever, and also concentric with the pivot pin 17. In fact the spring is so constructed and arranged as to hold the latch or lock lever in a locked position or in an unlocked position, and in such wise that the lock lever or latch will instantly move to either one of said positions, particularly after the notch 24 passes a dead center passing through the pivot pin 17 and the notch 23.

When the latch or lock lever is moved upward, the lug 20 disengages the notch 9, then the extension post or the perpendicular side portion of the windshield is free to be disengaged from the socket 14.

As soon as the lock or latch lever is swung upward, the notch 24 will swing past a dead center through the pivot pin 17 and the notch 23, the spring loop will tend to move the latch or lock lever the rest of the way.

As soon as the lock lever is moved downward from unlocked position toward a locked position, the spring loop will tend to exert tension upon the lever when it passes below the dead center passing through the pivot pin 17 and the notch 23. When the notch 24 moves below the pivot 17, the tension exerted by the spring is great enough to instantly move the lever toward and in contact with the extension post or side portion of the usual windshield.

Where the pivoted joint between the windshield sections is very close to the top of the windshield, the lock or latch lever 18ª is made to conform to the contour shown in Figure 6. This form of lever is used to permit the lever to clear itself from the windshield hinge, so that it will not interfere with the operation of the thumb nut or thumb screw of the hinge.

The invention having been set forth, what is claimed is:—

1. In an automobile top and windshield coupling, a perpendicular post, a plate secured to the forward part of the automobile top and provided with a socket receiving the upper extremity of said post, a latch or lock lever pivotally mounted upon said plate, and provided with a lug operatively connecting with said post for holding it in the socket, and spring means operatively connecting the plate and the lug and extending over the pivot, said spring means operatively tensioning upon either side of a dead center from the pivot to the fastening of the spring means to the plate, for holding the lock lever in a locked or unlocked position.

2. In an automobile top and windshield coupling, the combination with a windshield post and an automobile top, of a plate secured to said top and provided with a socket to receive the upper end of said post, which is provided with a notch, a lock lever pivotally mounted upon said plate and provided with lugs to engage said notch to hold said post in the socket, a loop spring operatively connected to the plate and having its sides extending over the pivot of the lever at an obtuse angle and connected to the lever, the construction and arrangement of said spring being such as to tension upon either side of a dead center passing through the pivot and the connection of the spring to the plate, for holding the lock lever in a locked position or an unlocked position.

3. In an automobile top and windshield coupling, the combination with a windshield post and an automobile top, of a plate secured to said top and having a socket for the reception of the upper end of said post, the rear portion of the plate having ears, a lock lever pivotally and operatively mounted between said ears and adapted to operatively connect and disconnect with the upper end of said post, a loop spring having its sides at an obtuse angle, one end of the spring loop connected to the plate, and its other end connected to the lock lever, the latter connection of the spring loop adapted to tension on either side of the dead center extending through the pivot and the connection of the spring loop to the plate, for holding the lock lever in a locked or unlocked position.

4. In an automobile top and windshield coupling, a perpendicular post, a plate secured to the forward transverse bar of the automobile top and provided with a socket receiving the upper extremity of said post, a latch lever operatively mounted upon the plate and adapted to overlie and assume a parallel position with the post and provided with means operatively engaging with said post for holding it in the socket, and spring means extending over the operative mounting of the latch lever and adapted to operatively tension upon either side of a dead center of said mounting for holding the latch lever in locked or unlocked positions.

In testimony whereof we hereunto affix out signatures.

JOHN V. BELLUOMINI.
AMILE L. LUCOT.